Dec. 31, 1940.  A. L. BAUSMAN  2,226,890
APPARATUS FOR AUTOMATICALLY MOLDING CONFECTIONERY
Filed Aug. 1, 1939  2 Sheets-Sheet 1
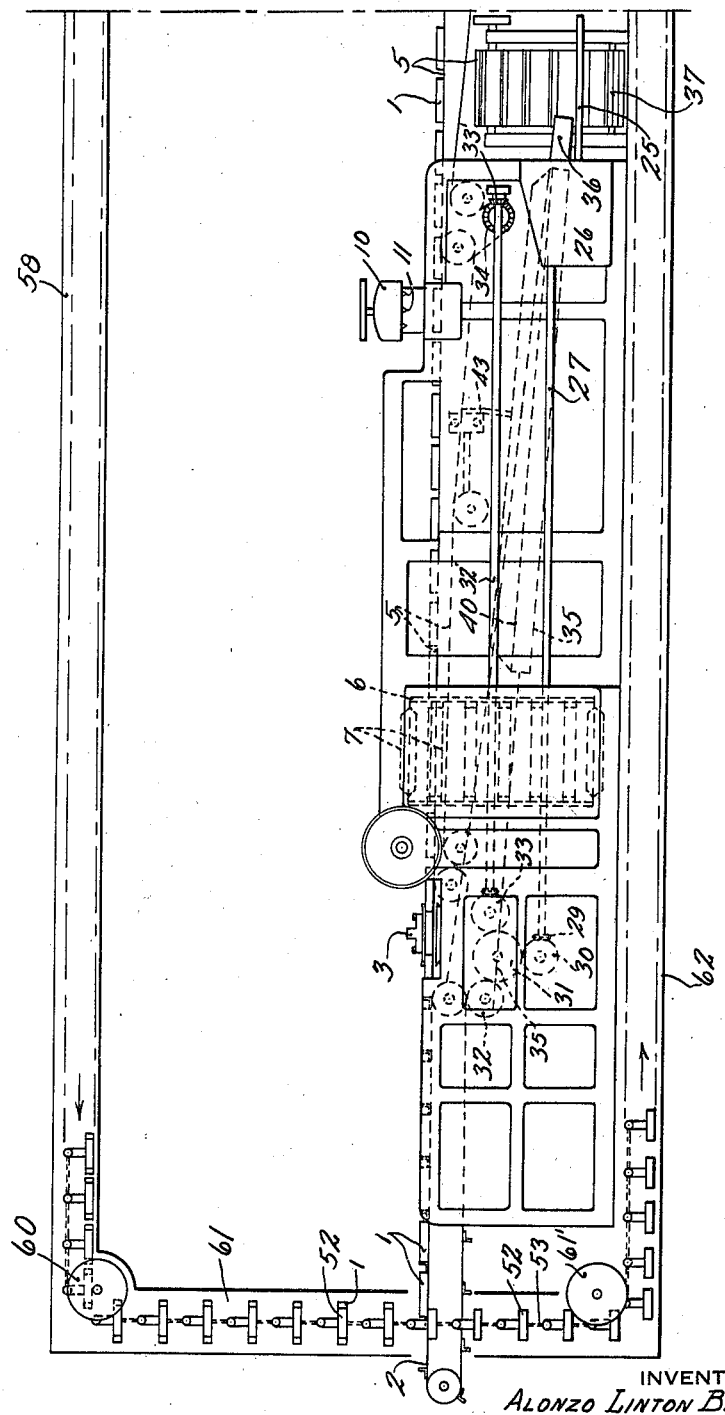
INVENTOR
ALONZO LINTON BAUSMAN
BY Clapin + Neal
ATTORNEYS

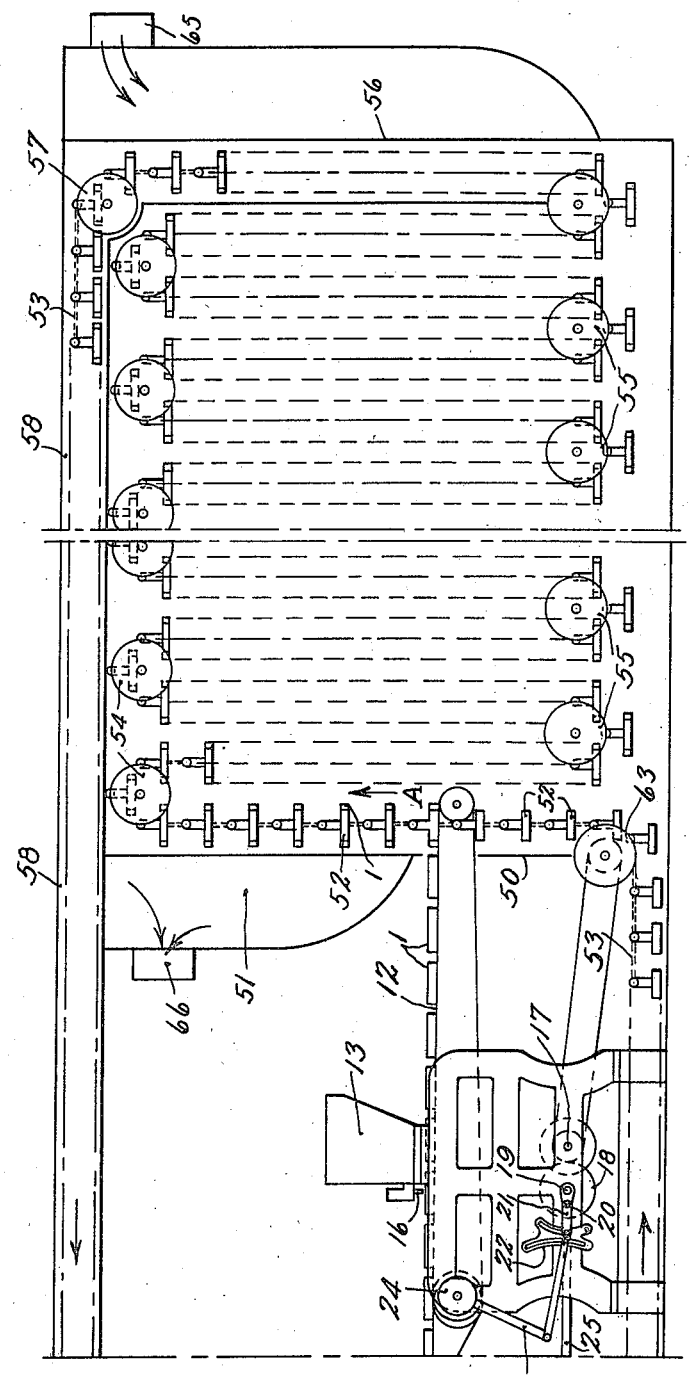

Patented Dec. 31, 1940

2,226,890

UNITED STATES PATENT OFFICE 2,226,890

APPARATUS FOR AUTOMATICALLY MOLDING CONFECTIONERY

Alonzo Linton Bausman, Springfield, Mass., assignor to National Equipment Company, Springfield, Mass., a corporation of Massachusetts Application August 1, 1939, Serial No. 287,732

2 Claims. (Cl. 107—3)

This invention relates to an improvement on my prior patent for a "Machine for automatically molding confectionery," No. 1,169,602, dated January 25, 1916.

In the customary use of the structure shown in said patent the general operation is as follows: Trays containing confections embedded in starch enter the machine at one end on an intake conveyer, and the trays are emptied of their contents, the starch and confections being suitably separated. Then a new charge of starch is put into each tray, a matrix made to act on the starch to form therein mold cavities, and the cavities so formed filled with confection. The trays with the freshly filled molds leave the machine by a discharge conveyer, are removed by an attendant, and set aside in stacks to allow their contents to set before their reintroduction into the machine by way of the intake conveyer.

In such a machine the separation of the starch and confections after the incoming tray has been dumped is carried on in a series of steps. First, the confections and starch drop bodily onto an inclined screen with most of the starch passing through the meshes but with the confection remaining on the upper side. Then, the confections roll down the incline and out a discharge spout onto a conveyer which removes them from the machine. In their passage down the incline the confections pass through a brushing device which removes the rest of the starch from the confections, and this starch in turn passes through the meshes of the screen into the base of the machine.

As will be recalled, the trays when freshly filled with confection are removed from the discharge conveyer by an attendant, stored in stacks and, when their contents have set, reintroduced into the machine. While it takes a definite time for the confections to set and the attendant knows this, he may inadvertently introduce the trays before sufficient time has elapsed. If the condition of the confection in the incoming trays is not closely regulated the confection is sticky or soft when it is dumped onto the screens, and the starch not only is not properly removed but the screens and brush become clogged due to adherence of sticky confection. When this happens, the machine must be stopped, disassembled, and completely cleaned, which not only is an expensive operation but limits the availability of the machine for production.

The main purpose of my present invention is to provide a new combination which will avoid this difficulty. Another purpose is to provide a new machine for not only doing the work of said patented machine, but also to do additional work and do it automatically, as will be clear from a reading of the specification along with the accompanying drawings, in which—

Fig. 1 is a somewhat diagrammatic side view of one portion of the new combination; and Fig. 2 is a continuation of Fig. 1 and shows with Fig. 1 the complete assembly.

Referring to Fig. 1, I will explain generally the operation of the confectionery machine itself. This structure is similar to the one shown in my earlier patent referred to, and a more detailed understanding of the same, if desired, can be had by a reading of said patent. The trays 1 containing starch with confections embedded in molds formed in the starch are fed to the machine by the intake conveyer 2 and pass first to the dumper 3. Here each tray 1 is supported on ways while the tray is turned upside down by the dumper 3 to allow the contents to fall out.

At the proper time, after the tray has been again turned right side up, an intermediate conveyer 5 passes the tray along to the starch elevator 6 where a new charge of starch is put in the tray. This starch elevator 6, as is further described in the earlier patent referred to, consists of a series of buckets 7 which constantly lift starch from the lower reaches of the machine and drop it onto the trays as they pass along. After each tray has received its new charge of starch it passes through mechanism (not shown) which levels off the surface of the starch and the tray then goes on into the printer 10. The printer 10 has a matrix 11 which forms molds in said starch and then the trays 1 are carried by the intermediate conveyer 5 onto the depositor or discharge conveyer 12 (see Fig. 2).

This last conveyer 12 carries the tray through the depositor 13 where the molds formed in the starch by the printer 10 are filled with confection. Nozzles 16 in the depositor head discharge the confection during this operation.

As the earlier patent describes, in order to get proper operation of the machine the timing of the various conveyers, as well as that of the dumper and printer must be done from the depositor. Thus, a gear on the main shaft 17 of the depositor operates in turn the gear 18 on shaft 19. This last shaft has at one end a crank arm and pin 20, which operates linkage 21, 22, and 23, and gives a periodic rotation to ratchet 24 connected to the conveyor 12. In this manner, the trays are periodically moved along past the nozzles 16 of the depositor.

Shaft 19 in turn has gearing thereon, not shown, which drives the horizontal drive shaft 25 of transmission 26, see Fig. 1. This transmission 26 is adjustable to drive at various speeds shaft 27 which, through gears 29, 30, 31, and 32, imparts motion to intake conveyer 2 and through gears 29, 30, 31, and 33 drives shaft 32'. Shaft 32' in turn, through gears 33' and 34, drives conveyer 5. Gear 31 is a mutilated gear and gives a periodic drive to conveyers 2 and 5 through their respective gearing. Both conveyers are thus operated periodically and in timed relation to the depositor.

Returning now to the dumper 3, when the starch and confections fall out of the tray they land on screen 35, with most of the starch passing through the meshes, but with some clinging to the confections. The confections then pass down the screen 35 to the discharge spout 36 and are picked up by the conveyer 37 which extends laterally. During their passage from the upper to the lower reaches of the screen 35 the confections are given a thorough brushing by brush 40 mounted to swing laterally as at 43 over a series of bristles affixed to the upper surface of the screen 35. The confections, therefore, are entirely free from starch when they leave the spout 36. The starch removed by the brush 40 drops through the screen 35 into the base of the machine.

The description thus far deals with matter fully described in my prior patent and, therefore, no further detailed consideration will be given this portion of the structure.

As has been pointed out earlier, the meshes of screen 35 will become clogged by sticky confection if the confection has not set when it is dumped from the trays, and this will make necessary a complete disassembly of the machine to clean the screens.

I will, therefore, now explain how I have been able to prevent any opportunity for the trays to be returned to the intake conveyer 2 before the confection has set, by putting each through a definite cycle, and also have arranged the structure so that once a tray has started on its cycle it is inaccessible to the attendant whereby the cycle cannot be interfered with by human error.

Discharge conveyer 12 carries the trays 1 through the outer wall 50 of an enclosed cooling chamber 51 where each tray is picked up by a flight 52 of the continuous conveyer 53 operating in the direction of the arrow A.

This conveyer 53 laps back and forth between a series of pulleys 54 and 55 located in staggered relation along the top and adjacent the bottom of the chamber, passes up a riser 56 around pulley 57, along a tube or duct 58 over the confectionery machine, around pulley 60, and down riser 61, where the flights 52 discharge their trays onto the intake conveyer 2. The empty flights 52 complete their circuit by passing around pulley 61' along under the machinery through passage 62 and around pulley 63.

The conveyer 53 is operated at a constant speed by a direct drive from the main shaft 17 in the depositor, as indicated, the conveyer being therefore properly timed with the intake and delivery conveyers in the machine.

In order to aid in the setting of the confections in the trays, air may be circulated through the chamber by the inlet 65 and outlet 66.

As will have been apparent from the preceding description, my new combination has many features which were not before available and which not only contribute to the solution of the problem of regulating the setting of the confections delivered to the dumper, but improve the work performed by the machine. However, to emphasize these features, I will point out a few of them in more detail. For instance, the confections in each of the trays have an equal opportunity to set because each tray passes through the same path in the chamber. This results in uniformity in the confection at the intake conveyer.

The trays from the moment of their delivery to the chamber until their return to the intake conveyer are completely inaccessible from the outside so that under normal circumstances there is no opportunity for the introduction of a human error.

However, the most important feature is that because there is a positive guaranty that the trays must pass through a definite cycle; if this cycle is once adjusted correctly, all the trays will be in the right condition for proper cleaning of the confection when the trays are dumped, and their contents allowed to pass over the screening and through the cleaning devices described. This avoids any possibility of the machine being rendered inoperative because of the clogging of the screening as previously discussed, and thereby makes the results of this type of confectionery machinery more certain and its operation continuous, to the obvious advantage of the art.

I claim:

1. In confectionery machinery having a single machine with an intake station for receiving trays filled with solidified confection embedded in starch, an intake conveyor for movement of the trays in a step-by-step motion into the machine, means in the machine to dump the trays, refill the trays with starch, mold cavities in the starch, deposit confection in the cavities so formed and deliver the filled trays to a delivery station, said means including a delivery conveyor having a step-by-step movement for delivery of the trays to the delivery station; conditioning mechanism for receiving the freshly-filled trays at the delivery station and for conveying them to the intake station of said machine, while subjecting the trays and contents to a conditioning cycle, said mechanism comprising a conditioning chamber having a forward wall with two openings therein, one at the bottom and one at the delivery station of the machine, and a rear wall with an opening therein at the bottom, a duct connected to said last named opening and extending vertically along the back wall of the chamber, horizontally back over the chamber and machine, then downwardly at the front of the machine to the intake station, and thence to the floor, a duct passing beneath the floor to the opening at the bottom of the forward wall of the chamber, and a continuous motion conveyor rising vertically inside the forward wall of the chamber and arranged to pick up trays at the delivery station, and deliver them to the intake station, said conveyor passing in a series of laps to the back of the chamber between pulleys attached to the top and bottom of said chamber, then rising up said back duct, passing through said duct to the front of the machine and downwardly to the intake station and then to the floor and finally back through said duct under the floor to the bottom opening in the forward wall of the chamber.

2. Apparatus for handling starch trays used in molding confections in starch, consisting of a conveyor with flights for carrying trays and having a conditioning portion and a delivery portion, the conveyor in said conditioning portion lapping back and forth between supports to form a long tortuous, closely packed path with the first lap rising vertically from the bottom of said portion, and the conveyor in said delivery portion passing laterally over the conditioning portion from a point at the end of the last lap in said conditioning portion to a point lying in a plane parallel to and remotely displaced from said first lap, then downwardly in said plane to the level of the bottom of the conditioning portion and finally horizontally back to the bottom of the first lap in the conditioning portion, the flights of said conveyor being adapted to deposit starch trays carried thereby on a horizontally moving conveyor during downward movement of the flights and to remove starch trays from a horizontally moving conveyor during upward motion of the flights, the distance between the first lap in said conditioning portion and said parallel plane being dimensioned to permit the insertion therebetween of a conventional automatic machine for molding confections in starch trays of the type having horizontally moving conveyor means to carry starch trays from a feeding station at one end of said machine through the machine to a delivery station at the other end thereof, with the horizontally moving conveyor means of the machine at the feeding station in position to receive trays from a downwardly moving flight of the first mentioned conveyor located in the aforementioned spaced plane and the horizontally moving conveyor means of said automatic machine at the delivery station in position to deliver trays to an upwardly moving flight of the first mentioned conveyor in the conditioning portion.

ALONZO LINTON BAUSMAN.